United States Patent [19]

Esposito

[11] Patent Number: 5,544,910

[45] Date of Patent: Aug. 13, 1996

[54] PORTABLE LUGGAGE CART

[75] Inventor: Patsy Esposito, Brooklyn, N.Y.

[73] Assignee: Products Finishing Corporation, Brooklyn, N.Y.

[21] Appl. No.: 311,903

[22] Filed: Sep. 26, 1994

Related U.S. Application Data

[63] Continuation of Ser. No. 981,293, Nov. 25, 1992, abandoned.

[51] Int. Cl.⁶ ..................................... B62B 1/12
[52] U.S. Cl. .................. 280/654; 280/47.29; 280/47.33
[58] Field of Search ................................... 280/651, 652, 280/654, 37, 655, 47.18, 47.24, 47.27, 47.29, 47.33, 47.28

[56] References Cited

U.S. PATENT DOCUMENTS

| | | | |
|---|---|---|---|
| 2,364,246 | 12/1944 | Shaver et al. | 280/47.33 |
| 2,602,676 | 7/1952 | Fieldhouse | 280/47.33 |
| 2,806,708 | 9/1957 | Finstad | 280/36 |
| 3,177,000 | 4/1965 | Alexander | 280/36 |
| 3,804,432 | 4/1974 | Lehrman | 280/47.33 |
| 3,893,687 | 7/1975 | Victor | 280/47.33 |
| 4,175,769 | 11/1979 | Kazmark | 280/654 |
| 4,448,440 | 5/1984 | Gier | 280/47.29 |
| 4,452,468 | 6/1984 | Eads et al. | 280/654 |
| 4,746,141 | 2/1988 | Willis | 280/655 |
| 4,917,401 | 4/1990 | Iwaki | 280/655 |
| 4,974,862 | 12/1990 | Maupin | 280/47.27 |
| 5,348,325 | 9/1994 | Abrams | 280/47.29 |

Primary Examiner—Richard M. Camby
Attorney, Agent, or Firm—Darby & Darby, P.C.

[57] ABSTRACT

The invention is a collapsible luggage cart for hauling luggage items across a floor. The luggage cart includes a handle, a carrying platform for receiving the luggage items, and a hinge which is used to connect the carrying platform to the handle so that the carrying platform is pivotal between a fully raised position wherein the carrying platform is generally parallel to the handle, and a fully lowered position wherein the carrying platform is generally perpendicular to the handle. Means are provided for supporting the luggage cart assembly in a vertical position with respect to the floor when the carrying platform is in either the fully raised position or the fully lowered position.

11 Claims, 6 Drawing Sheets

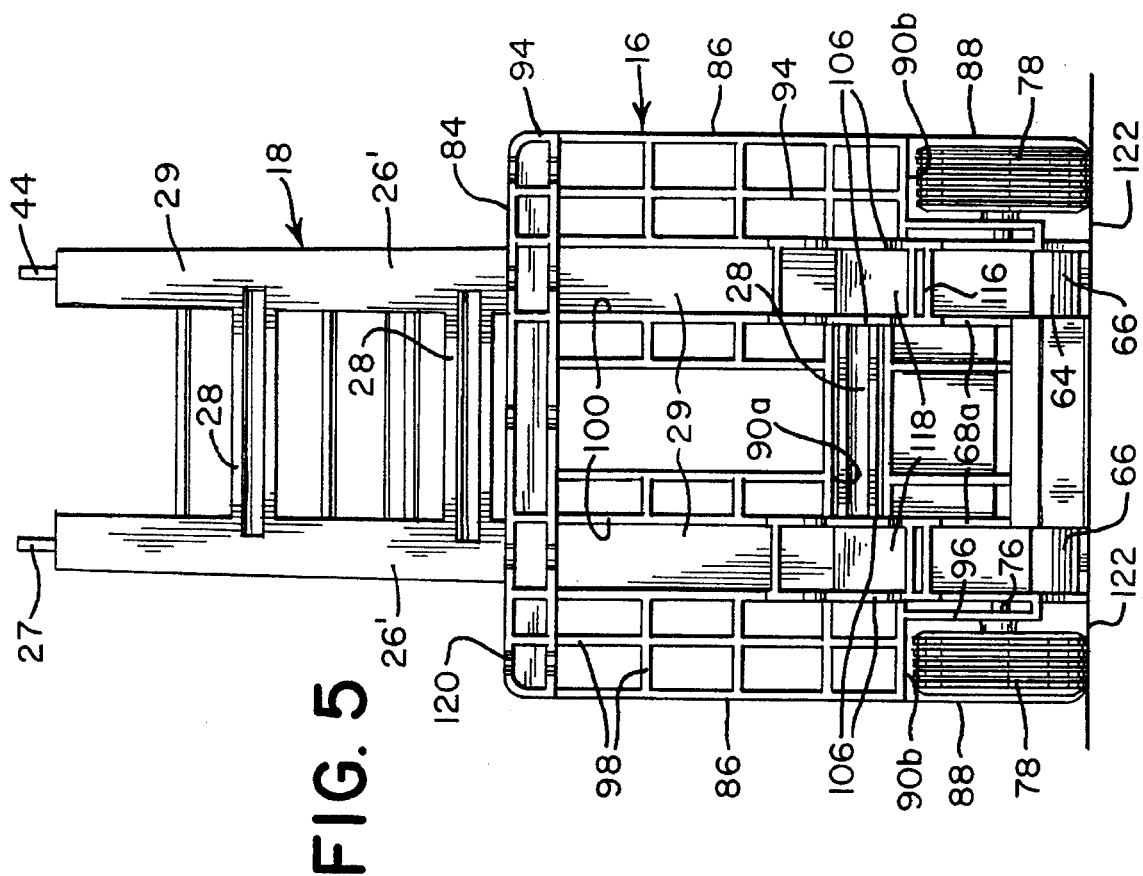
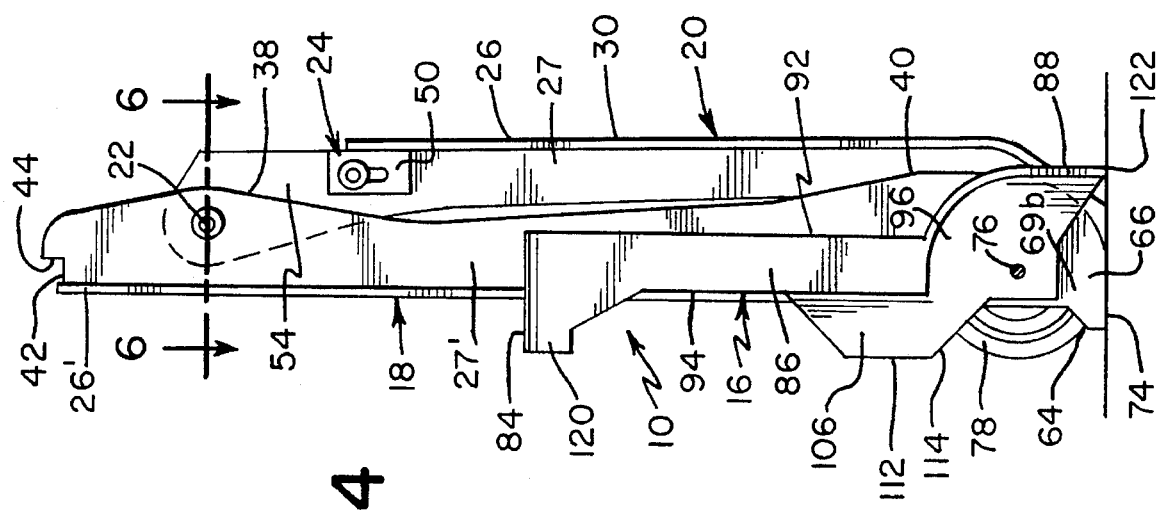

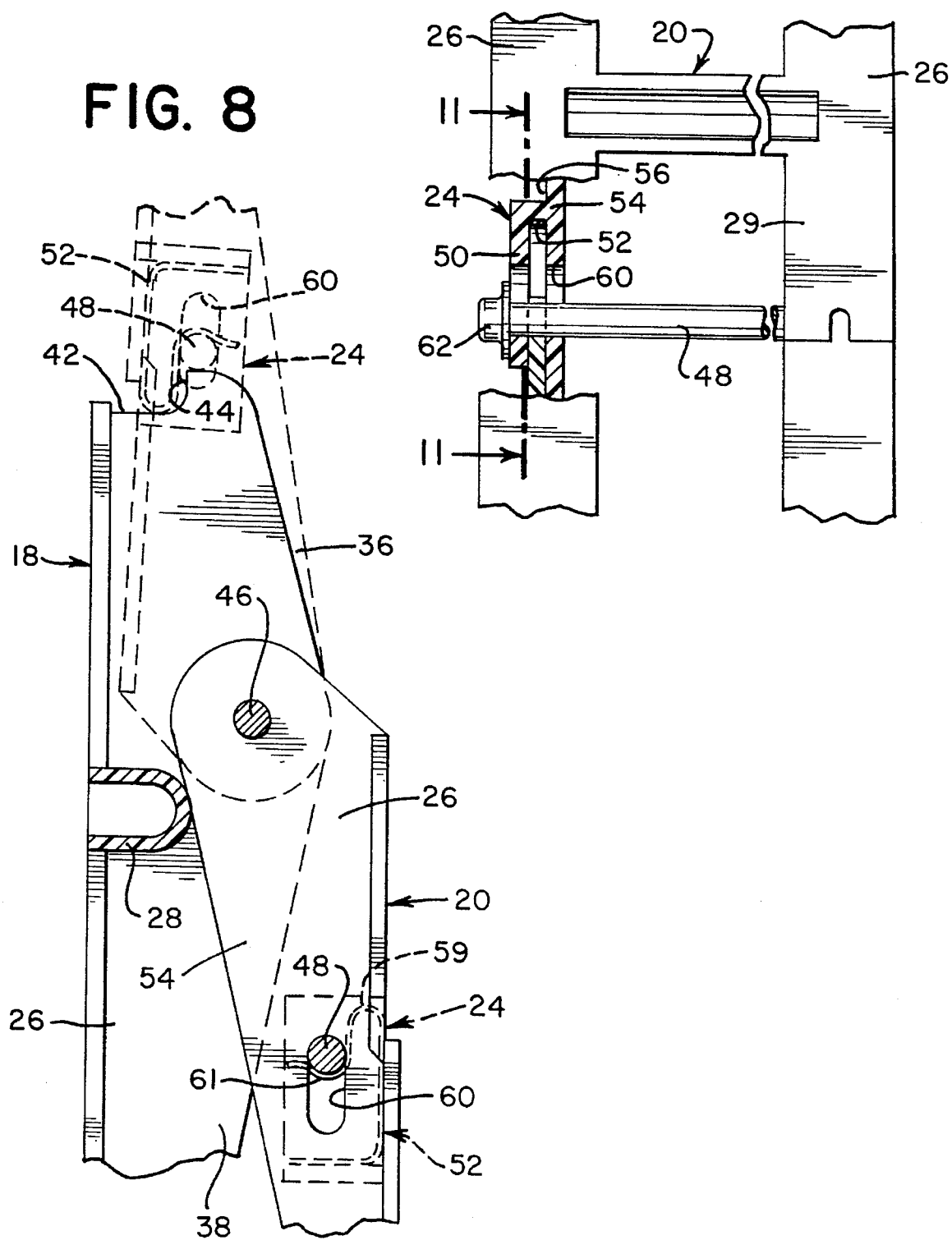

PORTABLE LUGGAGE CART

This is a continuation of application Ser. No. 07/981,293, filed Nov. 25, 1992 now abandoned.

FIELD OF THE INVENTION

The present invention relates to wheeled luggage carriers of the type which are collapsible and portable.

BACKGROUND OF THE INVENTION

Luggage carts have been available for many years. Although there are many different types having a variety of features, the structure of most luggage carts is based on the traditional hand truck design typically used by workers to transport heavy objects onto or from trucks or between different areas within a warehouse.

Both the hand truck and the luggage cart offer a simple leverage advantage to the user so that otherwise bulky or heavy objects may be easily lifted and transported to another location. In their simplest form, both carrying devices include a wheeled axle which functions as a fulcrum, a carrying platform extending a prescribed distance from the axle, and a handle attached to a rear edge of the carrying platform. The handle is attached to the carrying platform usually at a right angle and extending a greater distance than the prescribed distance to ensure a leverage advantage over any weight exerted on the carrying platform. Although similar, the typical hand truck is regarded as a sturdy heavy device of fixed structure to be used in one general location whereas the traditional luggage cart (of the prior art) is designed to be carried by a user (such as a traveler) with his luggage from one location to another.

Since the luggage cart is essentially an extra piece of luggage, it must be convenient to carry when not in use, and easy to assemble and collapse. It must also function effectively as a hand truck while carrying luggage within areas which include obstacles not typically encountered by users of traditional hand trucks. Among these obstacles are escalators, stairs, roads and curbs, bumps, door-jams, pot holes and relatively wide gaps such as those found between a train car and a platform.

The principle object of the invention is to provide an improved luggage cart.

It is another object of the invention to provide a luggage cart which is inexpensive to manufacture, easy to use, lightweight and compact.

It is another object of the invention to provide a luggage cart which is self standing in either the collapsed position or the assembled position.

It is still another object of the invention to provide a luggage cart which is easily converted from its assembled position to its collapsed position using one hand.

SUMMARY OF THE INVENTION

The invention resides in a collapsible luggage cart for hauling luggage items. The luggage cart includes a handle, a carrying platform for receiving the luggage items, and a hinge which is used to connect the carrying platform to the handle so that the carrying platform is pivotal between a fully raised position wherein the carrying platform is generally parallel to the handle, and a fully lowered position wherein the carrying platform is generally perpendicular to the handle. Means are provided to support the luggage cart assembly in a vertical position with respect to the floor when the carrying platform is in either the fully raised position or the fully lowered position.

BRIEF DESCRIPTION OF THE DRAWING FIGURES

FIG. 4 is a partial side view of the luggage cart in accordance with the preferred embodiment of the invention with the cart in the collapsed position and one wheel removed;

FIG. 5 is a front view of the collapsed luggage cart shown in FIG. 4;

FIG. 8 is a partially cross-sectional side view of the handle locking mechanism illustrating a collapsed handle position and an almost fully locked extended handle position (shown in phantom);

FIG. 9 is a partially cross-sectional front view of a portion of the handle locking mechanism;

DETAILED DESCRIPTION OF THE PREFERRED EMBODIMENT

Figure 1:
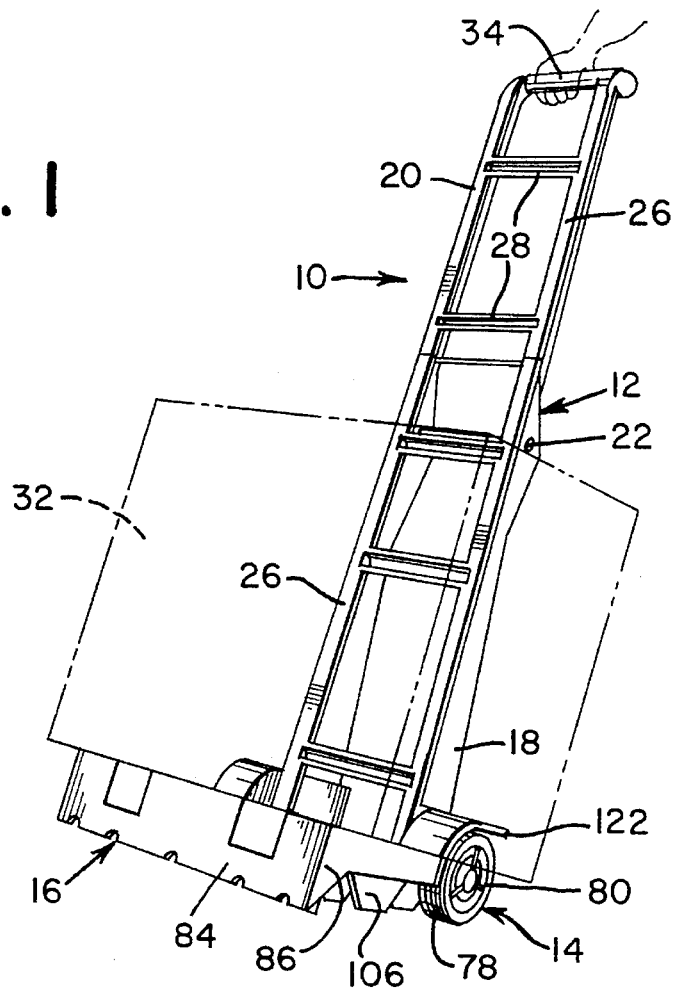
FIG. 1 is a perspective view of a luggage cart in accordance with a preferred embodiment of the invention showing it in use hauling one luggage item (the luggage is shown in phantom)
Figure 2:
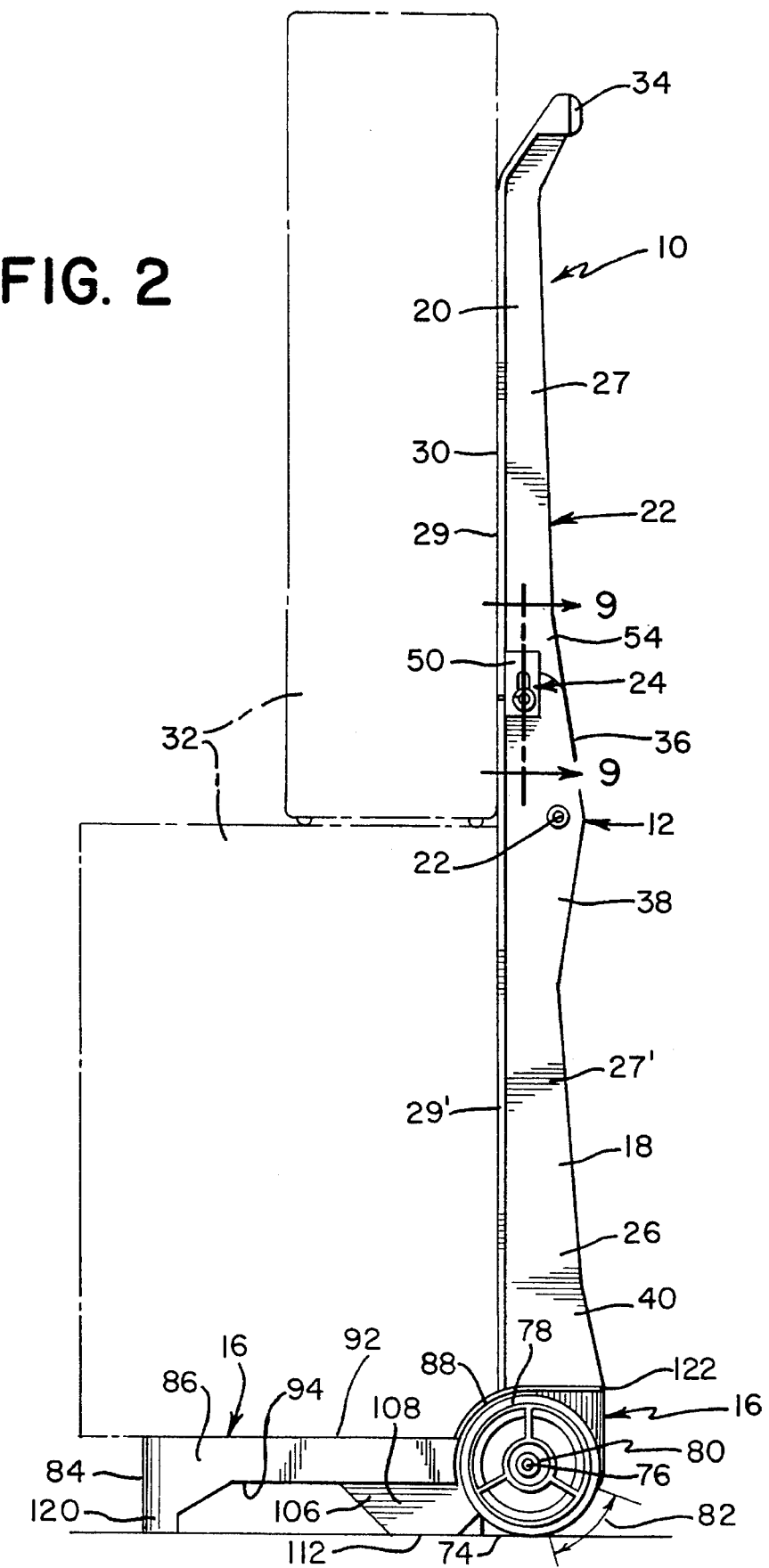
FIG. 2 is an overall side view of the luggage cart of FIG. 1 in an assembled self-standing position loaded with two luggage items.

Referring to FIGS. 1 and 2, a luggage cart is illustrated in accordance with a preferred embodiment of the invention. As discussed above in the Background Section, most prior art luggage carts, including the one disclosed here, follow the basic structure of a standard hand truck. The main differences lie in their portability, ease in use and efficiency, and cost factors of manufacturing. The present invention is such a luggage cart which is portable in that its structure folds to a relatively compact size.

The preferred embodiment of the luggage cart 10 includes three main sections, a handle assembly 12, a wheel assembly 14, and a carrying platform 16. The handle assembly 12 includes two sections, a lower handle section 18 and an upper handle section 20. The upper handle section 20 is pivotally connected to the lower handle section 18 at a pivot axis 22 so that both sections may fold about the pivot axis 22 between a collapsed handle position and an extended handle position. A locking mechanism 24 is located adjacent the pivot axis 22 and automatically locks the two handle sections 18 and 20 in the extended handle position. The locking mechanism and the pivot connection of the two handle sections 18 and 20 are described in greater detail below.

The lower handle section 18, the upper handle section 20, and the carrying platform 16 are preferably made from a lightweight strong rigid plastic using any appropriate manufacturing method such as split casting or injection molding. The main sections of the luggage cart 10 may also be made from a similarly lightweight strong rigid metal such as titanium, magnesium or aluminum using any appropriate metal fabrication procedure such as sheet cutting, or metal casting.

Figure 6:
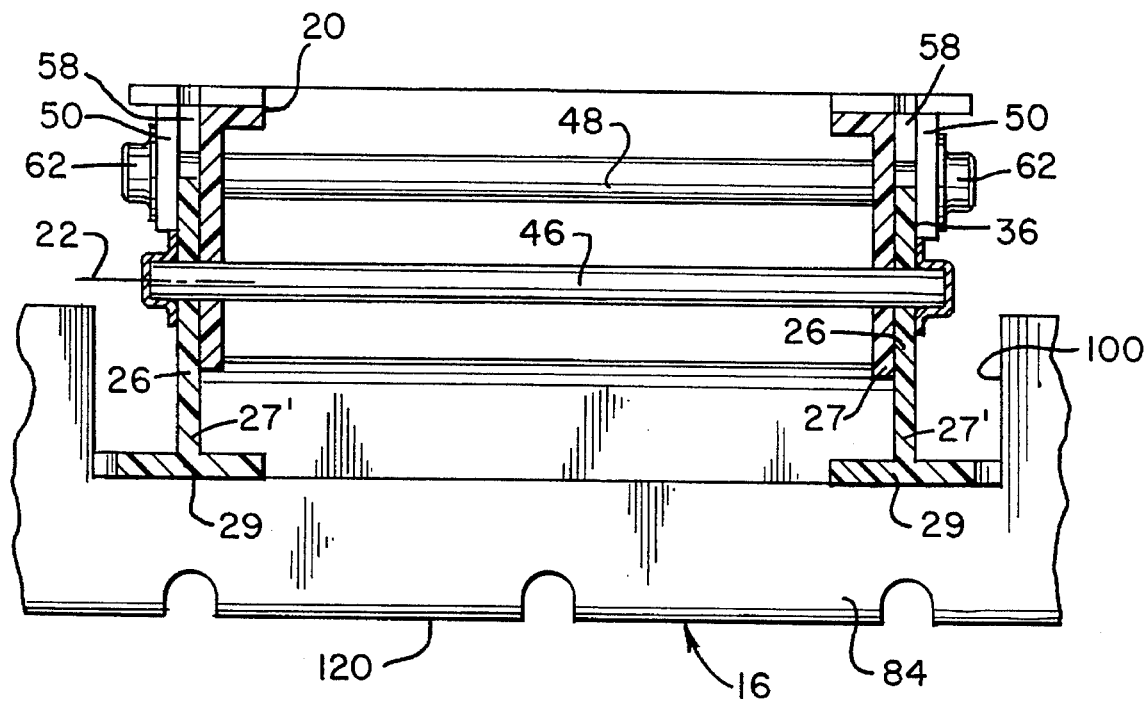
FIG. 6 is a cross-sectional view taken along the lines 6—6 of FIG. 4 showing details of a handle locking mechanism.

The handle assembly 12 as shown in FIGS. 1 and 2 preferably has a basic structure similar to that of a typical ladder including two parallel side rails 26 separated and connected to each other by several spaced cross support rungs 28. The cross support rungs 28 work together to provide lightweight structural rigidity to the entire handle assembly 12 so that the luggage cart 10 when being pushed or pulled is responsive to the controls of the user (i.e., the handle assembly 12 does not twist when the luggage cart 10 is steered). The side rails 26 preferably have a "T" cross-section as shown in FIG. 6 with the stem portion 27 of the "T" facing rearward and the flat top portion 29 of the "T" facing forward (the forward direction is towards the carried luggage). The use of a "T" cross-sectional shape for the side rails 26 ensures rigidity and strength of the handle assembly without sacrificing weight and also provides a beneficial flat contact surface 29 for contacting the luggage items 32.

The handle assembly 12 includes an uppermost connecting support rung which additionally functions as a grasping handle 34. The two side rails 26 are preferably curved rearward as shown in FIG. 2 to ensure that the grasping handle 34 remains accessible to the user's hands even when the height of the luggage items 32 exceeds the length of the handle assembly 12. With this arrangement the grasping handle 34 will always reside away from the flat contact surface 30.

The distance between the two parallel stem portions 27 of the side rails 26 of the upper handle assembly 20 is slightly less than the corresponding distance between the two parallel stem portions 27 of the side rails 26 of the lower handle assembly 18. This difference in stem-to-stem distance of the two handle sections 18 and 20 allow the stem portions 27 of the upper handle section 20 to interface in a nested relationship with the stem portions 27 of the lower handle section 18 when the handle assembly 12 is in the collapsed handle position. The nesting arrangement of the two handle sections 18 and 20 is illustrated in FIG. 4.

The stem portion 27' of the side rails 26' of the lower handle section 18 is shaped along a rear stem edge 36 both at the upper end 38 and the lower end 40 of the lower handle section 18. The shape of the rear stem edge 36 is shown in profile in FIG. 2. The shape of the rear stem edge 36 at the upper end 38 of the lower handle section 18, as illustrated in FIG. 8, is curved relatively sharply towards the front of the luggage cart 10 ending abruptly at a locking notch 42 which includes a rear notch engagement surface 44. The rear notch engagement surface 44 is essentially vertical (parallel to the flat contact surface 30), in this preferred embodiment and receives a portion of the locking mechanism 24, as described below.

The stem portion 27 widens at a point adjacent the pivot axis 22 to accommodate and support a pivot axle 46 which lies along the pivot axis 22 and pivotally connects the upper handle section 20 to the lower handle section 18.

From a point just below the pivot axis 22, the shape of the rear stem edge 36 widens gradually, as shown in FIG. 2, towards the lower end 40 of the lower handle section 18. This gradually rearwardly sloped rear stem edge 36 provides an important function of the present invention which is described in greater detail below.

Referring to FIGS. 6, 8, 9 and 11 the locking mechanism 24 includes a locking pin 48, a pair of "L"-shaped mounting brackets 50 and a spring 52. The locking pin 48 is mounted to a lower end 54 of the upper handle section 20 and extends through the two parallel side rails 26. The "L" shaped mounting brackets 50 are formed along an outer surface 56 of the stem portion 27 of both side rails 26. The "L" shaped mounting brackets 50 are preferably formed integrally with the formation of the handle assembly 12 (if a plastic material is used to form the handle assembly 12). The "L" shaped mounting bracket 50 defines a locking channel 58 whose width is approximately the thickness of the stem portion 27' of the lower handle section 18 so that the locking channel 58 may receive the upper end 38 of the lower handle section 18 when the handle assembly 12 is in its extended position. Each "L" shaped mounting bracket 50 includes an elongated opening 60, as shown in FIG. 8, to receive each respective end of the locking pin 48. Each respective stem portion 27 of each side rail 26 also includes a similarly shaped elongated opening aligned with the elongated opening 60 so that the locking pin 48 extending through both side rails 26, across each locking channel 58, and both "L" shaped mounting brackets 50. The locking pin 48 may slide within the two pairs of aligned elongated openings 60. An end cap 62 is fixed to each end of the locking pin 48 retaining the locking pin 48 in position between the "L" shaped mounting brackets 50.

Figure 11:
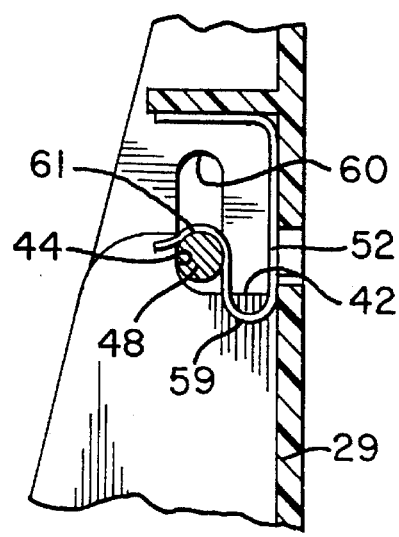
FIG. 11 is a cross-sectional view taken along the lines 11—11 of FIG. 9 showing details of the handle locking mechanism in accordance with the invention.

In accordance with the preferred embodiment of the invention, the spring 52 is made of spring steel bar stock and is shaped to snugly fit into the locking channel 58, as illustrate in FIG. 11. Referring now to FIG. 8, a portion of the spring 52 within the locking channel 58 preferably extends past the locking pin 48 towards the pivot axle 46 and parallel to the elongated opening 60. The spring 52 includes a loop bend 59 which directs the spring 52 back towards the locking pin 48. Another slight bend 61 craddles the locking pin 48 so that a bias is imparted to the locking pin 48 directing the locking pin towards the pivot axle 46. Two springs 52 are preferred, one located in each locking channel 58. By using two springs, the required spring tension is evenly distributed to both ends of the locking pin 48 while providing a comfortable middle section of the locking pin 48 accessible to a user's hand, as described below.

Referring to FIG. 8, the operation of the locking mechanism 24 automatically locks the upper handle section 20 to the lower handle section 18 when the upper handle section 20 is pivoted about the pivot axle 46 to the extended position. As this occurs, each "L" shaped mounting brackets 50 overlaps each respective upper end 38 of the lower handle section 18 causing each respective locking channel 58 to receive the previously described curved section of the rear stem edge 36. Eventually, each rear stem edge 36 contacts each respective end of the locking pin 48, forcing the locking pin 48 to slide within the elongated openings 60 against the spring bias of the spring 52. The locking pin "rides" along each rear stem edge 36 until it becomes aligned with the locking notch 42. At this point the spring action forces the locking pin 48 into locking engagement within the locking notch 42. Since the stem portion 27 of the lower handle section 18 is snugly sandwiched within the locking channel 58 of each "L" shaped mounting bracket 50, a tight, rigid engagement between handle sections 18 and 20 is ensured.

To collapse the handle assembly 12, the locking pin 48 is simply pulled (by hand) against the action of the spring 52 from the locking notch 42. As the user holds the locking pin 48 from the locking notch 42, the upper handle section 20 is folded about the pivot axle 46 to the collapsed handle position.

The flat contact surface 29 of each side rail 26 of the entire handle assembly 12 becomes progressively wider from the grasping handle 34 towards the lower end 40 of the lower handle section 18. Each flat contact surface 29 terminates just below the lowest cross support rung 28 at a respective angled platform stop 64. Each angled platform stop 64 is downwardly sloped forward and is used to support (and provide a stopping point for) the carrying platform 16 when the luggage cart 10 is in its assembled position, as is described in greater detail below.

The stem portion 27 of each side rail 26 extends downwardly past the lowest cross support rung 28 and connects with a wheel mount 66. Each wheel mount 66 includes two side walls, an inner side wall 68a and an outer side wall 68b which extend rearwardly from the two edges of each flat contact surface 29 and an upper connection wall 70. The connection wall 70 of each wheel mount 66 is perpendicularly connected to each respective stem portion 27. A slot 72 is formed within the upper connection wall 70 to receive a part of the stem portion 27 of each side rail 26 of the upper handle section 18 when the luggage cart 10 is in its collapsed position. The slot 72 minimizes overall bulk of the luggage cart 10 in its collapsed compact position.

The connection wall 70 and the two side walls 68a, 68b of each wheel mount 66 is coplanar with the rear stem edge 36. The two pairs of side walls 68a, 68b (two from each wheel mount 66) extend downward and forward forming a curved shape, terminating at the angled platform stop 64 and defining a relatively flat foot section 74 which lies in a plane generally perpendicular to the flat contact surface 29.

It is important that the wheel mounts 66 be very strong because any weight lifted by the carrying platform 16 will be translated to the handle assembly 12 through the wheel mounts 66.

The wheel assembly 14 is directly connected to the handle assembly 12 at the wheel mounts 66. The wheel assembly 14 includes a wheel axle 76, two wheels 78, and two wheel nuts 80. The wheel axle 76 is positioned through appropriately aligned openings formed in each of pair of side walls 68 of each respective wheel mount. A wheel 78 is secured to each end of the wheel axle 76 protruding on either side of the luggage cart 10 from the wheel mounts 66. A wheel nut 80 is used to retain the wheels 78 in position on the wheel axle 76. The wheels 78 are sized and mounted in such a manner that a small contact portion 82 of each wheel 78 protrudes from the respective adjacent curved side walls 68. The contact portion 82 is the portion which will contact the ground or floor surface as the luggage cart 10 is being rolled. The contact portion 82 is preferably about 45 arc degrees rearward and upward from each respective flat foot section 74 measured along each respective curved side wall 68. In other words, as the luggage cart 10 is being used to haul luggage items along the floor, when the handle assembly 12 is about 45 arc degrees with respect to the floor surface, the contact portion 82 of each wheel will lie on the floor permitting the wheels 78 to roll.

The carrying platform 16 is preferably made from a strong resilient plastic and includes a front edge 84, two parallel side edges 86, two wheel fenders 88, a rear edge 90, and upper surface 92 and a lower surface 94. The carrying platform 16 is connected to the handle assembly 12 by way of the wheel axle 76. The rear edge 90 is made up of three sections, a middle section 90a, and two end sections 90b. All three rear edge sections 90a and 90b include appropriate aligned openings to receive the wheel axle 76. The middle rear edge section 90a is sized to snugly fit between the two inner side walls 68a of the two respective wheel mounts 66. This arrangement ensures that the upper surface 92 of the carrying platform 16 extends rearward past the flat contact surface 29 and also provides a strong hinge connection along all possible points of the rear edge 90. Each wheel fender 88 includes an inwardly directed side wall 96. Each side wall 96 includes an opening for connecting with the wheel axle 76 between the wheel 78 and the outer side wall 68b of each respective wheel mount 66.

Figure 3:
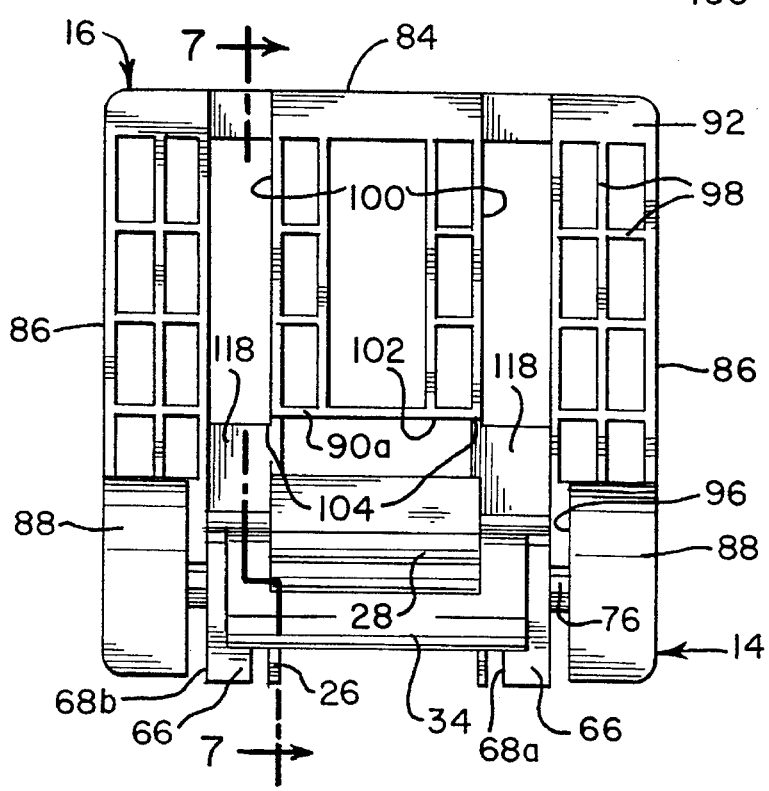
FIG. 3 is a top view of the carrying platform of the luggage cart in the assembled position.
Figure 7:
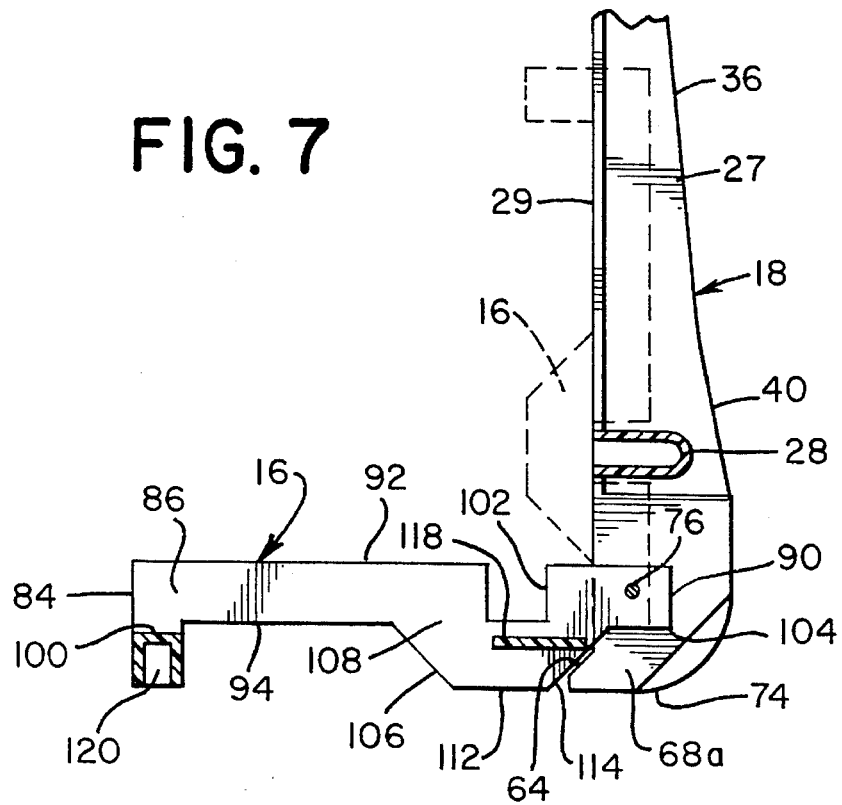
FIG. 7 is a cross-sectional view taken along the lines 7—7 of FIG. 3 showing connection details between the carrying platform and a lower handle.

The carrying platform 16 is pivotal about the wheel axle 76 between a stowed position (collapsed) as shown in FIG. 7 in dotted lines, and a lowered position, as shown in FIG. 7 in solid lines. In the preferred embodiment, the carrying platform 16 is formed with a series of grid-like interconnected ribs 98. The upper edges of all the combined ribs 98 form the upper surface 92 of the carrying platform 16 (the actual supporting surface), while the combined lower edges of the ribs 98 form the lower surface 94 of the carrying platform 16. The ribs 98 are arranged so that three main channels are established within the carrying platform 16, as illustrated in FIGS. 3 and 5. Two parallel side channels 100 and a single rear channel 102. The rear channel 102 is parallel to the rear edge 90 of the carrying platform 16 and connects with the two side channels 100 at rear channel-corners 104. The purpose of the channels 100 and 102 is to reduce the overall weight of the luggage cart 10 and to facilitate a thinner structure when the luggage cart is in its collapsed position. The rear channel 102 is aligned with and adapted to receive the lowest cross support rung 28 of the handle assembly 12 when the carrying platform 16 is in its raised and stowed position (see FIG. 7). The two side channels 100 are aligned with and adapted to receive the two respective side rails 26 of the lower handle section 18, again when the carrying platform is in its raised and stowed position.

Located at each rear channel-corner 104 is a rear supporting foot 106 which extends downwardly a prescribed distance from the lower surface 94 of the carrying platform 16. Each supporting foot 106 is formed by two parallel side walls 108 which are simply downwardly directed extensions of the two ribs 98 forming the walls of each side channel 100. Each supporting foot 106 is positioned in alignment with each side rail 26, and more specifically, with each angled platform stop 64.

The lower edge 110 of each pair of side walls 108 forming each rear supporting foot 106 includes a flat bottom section 112 which is coplanar with the flat foot section 74 of the wheel mounts 66 (only when the carrying platform 16 is in its lowered position). The lower edge 110 of each pair of side walls 108 of each supporting foot 106 slopes to the lower surface 94 of the carrying platform 16 in a rearward direction towards the wheel axle 76, as illustrated in FIGS. 4 and 7. This sloped edge 114 forms an angle with respect to the lower surface 94 of the carrying platform 16 which is complimentary with the angle formed by the angled platform stop 64. When the carrying platform 16 is hinged about the wheel axle 76 from the raised position to the lowered position, the sloped edge 114 of each rear supporting foot 106 contacts the adjacent surface of each respective angled platform stop 64. The result is that the carrying platform 16 is stopped at position preferably about 90 arc degrees with respect to the flat contact surfaces 29 of the handle assembly 12 and supported at that stopped position, as shown in FIG. 7.

An additional cross support rib 116 is positioned between the two sloped edges 114 of each rear supporting foot 106. The cross support rib 116 provides additional integrity to the contact point between the carrying platform 16 and the handle assembly 12. Also, a supporting web 118 is provided at each rear corner 104, preferably slightly below, yet parallel to the lower surface 94 of the carrying platform 16. Each supporting web 118 is connected between the two side walls 108 of each respective supporting foot 106. The supporting webs 118 are positioned so that when the carrying platform 16 is in its fully raised position, the webs 118 will lie flush with the respective flat contact surfaces 29 of each respective rail side 26.

The two side channels 100 extend forwardly away from the wheel axle 76 through the entire carrying platform 16, as shown in FIG. 3. A front supporting foot 120 is positioned adjacent to and just below the front edge 84 of the carrying platform 16. The front supporting foot 120 extends downwardly the same prescribed distance as the rear supporting feet 106 so that the carrying platform 16 and any load thereon is fully supported by the supporting feet 106 and 120 when the luggage cart 10 is fully assembled, but standing vertical (i.e., not tilted or in motion).

Referring to FIG. 4, the wheel fenders 88 are connected to the carrying platform 16 and extend from each respective rear edge end sections 90b of the carrying platform 16 around each respective wheel 78. When the carrying platform 16 is in its lowered position (see FIG. 4), each wheel fender 88 covers the front and upper portions of each respective wheel 78. Each wheel fender 88 includes a rear edge 122. Since the wheel fenders 88 are connected to the carrying platform 16, the wheel fenders 88 move together with the carrying platform 16 as it is hinged about the wheel axle 78. The wheel fenders 88 are sized and shaped so that when the carrying platform 16 is moved to the fully raised position the rear edge 122 of each wheel fender 88 will be coplanar with the flat foot section 74 of each respective wheel mount 66. The rear edge 122 of each wheel fender 88 work together with each respective flat foot section 74 to support the entire luggage cart 10 in a vertical position, as shown in FIG. 4, regardless of the position of the handle assembly 12 (either folded or extended).

The carrying platform 16 is preferably provided with an appropriate detent (or just a friction fit) not shown to ensure that it will maintain a selected position of either fully lowered or fully raised, as shown in FIG. 7.

Figure 10:
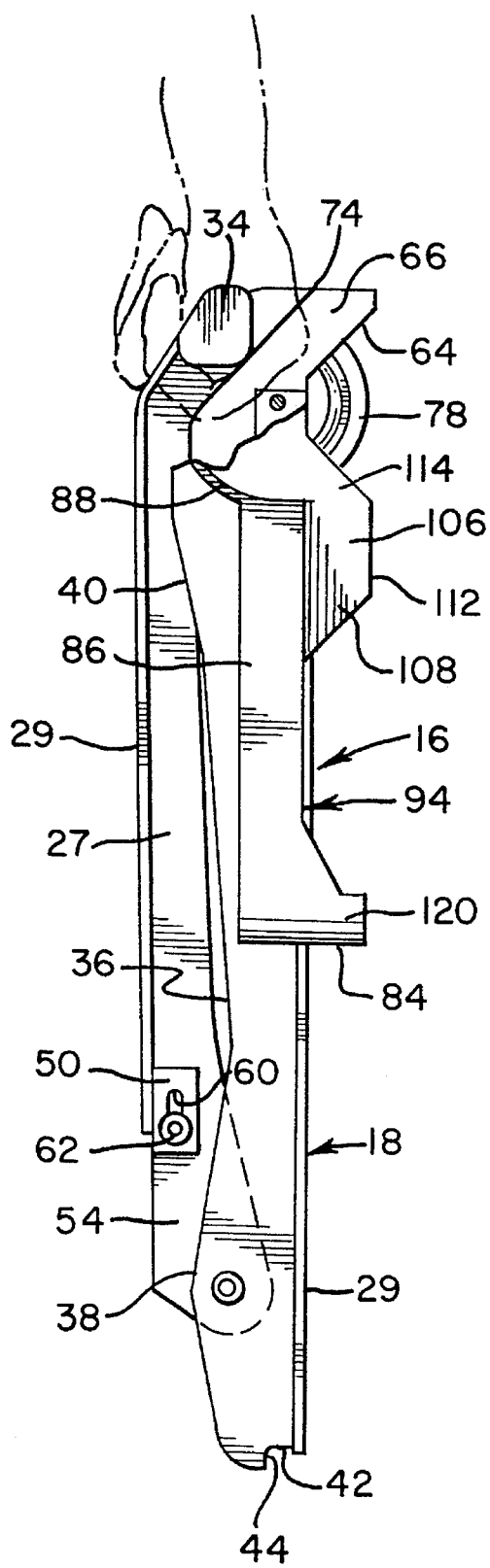
FIG. 10 is an overall side view of the luggage cart in the collapsed position being carried by a user in accordance with one embodiment of the invention.

In use, the luggage cart 10 when in the collapsed position as shown in FIG. 10, may be carried like a piece of luggage by either grasping the grasping handle 34, as shown in FIG. 10, or lifting the luggage cart 10 by the pivot axle 46 (or an appropriate cross support rung 28), as shown in FIG. 10. When carried in this latter orientation (as in FIG. 10), the luggage cart 10 may be conveniently rested on the floor in a standing position.

When use of the luggage cart 10 is required, the collapsed handle sections 18, 20 may be extended and locked, as described above and illustrated by FIGS. 1, 2 and 7 to form the handle assembly 12. The luggage cart 10 will still stand on its own, even with the handle assembly 12 fully extended.

Finally, the carrying platform 16 is lowered from its raised position, as shown in FIG. 5 (and in FIG. 7 in phantom), to its lowered position, as shown in FIGS. 2 and 7.

To re-collapse the luggage cart 10, the carrying platform 16 is simply raised until it is nested in parallel engagement with the side rails of the handle assembly 12. The locking pin 48 is then pulled from the locking notch 42 and the upper handle section 20 hinged to its collapse position, as shown in FIG. 4. The entire assembly procedure and the collapsing procedure thus described may be carried out using a single hand.

What is claimed is:

1. A luggage cart for carrying luggage items across a floor, comprising:

a handle having two pivotally connected sections which are selectively collapsible about a pivot axis between a fully extended position and a fully collapsed position, said handle further including two vertical, generally parallel, spaced side rails and at least one horizontal cross rung connected to each side rail to provide structural rigidity, said side rails having a "T" shape cross section, the flat top portion of said "T" facing forward, towards said carrying platform and the perpendicular stem portion of the "T" extending towards the rear of the luggage cart;

a carrying platform for receiving said luggage items;

a hinge located along a hinge axis and connecting said carrying platform to said handle so that said carrying platform is pivotal between a fully raised position wherein said carrying platform is generally parallel to said handle, and a fully lowered position wherein said carrying platform is generally perpendicular to said handle; and means for supporting said luggage cart in a vertical position with respect to said floor when said carrying platform is in either said fully raised position or said fully lowered position.

2. The luggage cart in accordance with claim 1, wherein said perpendicular stem portion of said "T" extends rearwardly from said pivot point down to a lower position along said handle adjacent said wheels, said stem portion of said "T" extending at said lower position further rearward than said wheels so that said stem portion of said "T" contacts any vertically displaced obstacle before said wheels make contact with said obstacle.

3. A luggage cart for carrying luggage items across a floor, comprising:

a handle having two pivotally connected sections which are selectively collapsible about a pivot axis between a fully extended position and a fully collapsed position, said handle further including a locking mechanism for selectively locking said handle sections in either said fully extended position or said fully collapsed position, said locking mechanism including a locking slot located in one of said handle sections adjacent to said pivot axis, a locking pin movably operable within said locking slot, a locking notch located in said other handle section adjacent to said pivot axis, means for biasing said locking pin at one end of said locking slot into engagement with said locking notch when said handle sections are in said fully extended position, said locking pin being moveable against said bias means within said locking slot so that said locking pin releases said locking notch and said handle sections may be pivoted to said fully collapsed position;

a carrying platform for receiving said luggage items;

a hinge located along a hinge axis and connecting said carrying platform to said handle so that said carrying platform is pivotal between a fully raised position wherein said carrying platform is generally parallel to said handle, and a fully lowered position wherein said carrying platform is generally perpendicular to said handle; and means for supporting said luggage cart in a vertical position with respect to said floor when said carrying platform is in either said fully raised position or said fully lowered position.

4. A luggage cart for carrying luggage items across a floor, comprising:

a handle;

a carrying platform for receiving said luggage items;

a hinge located along a hinge axis and connecting said carrying platform to said handle so that said carrying platform is pivotal between a fully raised position wherein said carrying platform is generally parallel to said handle, and a fully lowered position wherein said carrying platform is generally perpendicular to said handle; and means for supporting said luggage cart in a vertical position with respect to said floor when said carrying platform is in said fully raised position;

one wheel on each side of said luggage cart and means for mounting said wheels for rotation about said hinge axis;

wheel fenders connected to said carrying platform, said wheel fenders partially covering said wheels and including a floor contact portion which contacts said floor only when said carrying platform is in said raised position; and said floor contact portion helping to support said luggage cart in said vertical position when said carrying platform is in said raised position.

5. The luggage cart in accordance with claim 4, wherein said handle includes two pivotally connected sections which are selectively collapsible about a pivot axis between a fully extended position and a fully collapsed position.

6. The luggage cart in accordance with claim 5, further comprising a locking mechanism for selectively locking said handle sections in either said fully extended position or said fully collapsed position.

7. The luggage cart in accordance with claim 5, wherein said handle includes two vertical, generally parallel, spaced side rails and at least one horizontal cross rung connected to each side rail to provide structural rigidity.

8. The luggage cart in accordance with claim 7, wherein said side rails include a "T" shape cross section, the flat top portion of said "T" facing forward, towards said carrying platform and the perpendicular stem portion of said "T" extending towards the rear of said luggage cart.

9. The luggage cart in accordance with claim 7, wherein said at least one horizontal cross rung is positioned adjacent to said pivot axis so that said horizontal cross rung functions as a handle for carrying said luggage cart when in said fully collapsed position.

10. The luggage cart in accordance with claim 8, wherein said perpendicular stem portion of said "T" extends rearwardly from said pivot point down to a lower position along said handle adjacent said wheels, said stem portion of said "T" extending at said lower position further rearward than said wheels so that said stem portion of said "T" contacts any vertically displaced obstacle before said wheels make contact with said obstacle.

11. The luggage cart in accordance with claim 6, wherein said locking mechanism further comprises a locking slot located in one of said handle sections adjacent to said pivot axis, a locking pin slidably operable within said locking slot, a locking notch located in said other handle section adjacent to said pivot axis, means for biasing said locking pin at one end of said locking slot so that said locking pin is biased into engagement with said locking notch when said handle sections are in said fully extended position, said locking pin is moveable against said bias means within said locking slot so that said locking pin releases said locking notch and said handle sections may be pivoted to said fully collapsed position.

* * * * *